US012604153B2

(12) United States Patent
Mate et al.

(10) Patent No.: US 12,604,153 B2
(45) Date of Patent: Apr. 14, 2026

(54) VIRTUAL CONTENT

(71) Applicant: Nokia Technologies Oy, Espoo (FI)

(72) Inventors: Sujeet Shyamsundar Mate, Tampere (FI); Arto Juhani Lehtiniemi, Tampere (FI); Jussi Artturi Leppänen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 147 days.

(21) Appl. No.: 18/729,452

(22) PCT Filed: Jan. 13, 2023

(86) PCT No.: PCT/EP2023/050686

§ 371 (c)(1),
(2) Date: Jul. 16, 2024

(87) PCT Pub. No.: WO2023/147978

PCT Pub. Date: Aug. 10, 2023

(65) Prior Publication Data

US 2025/0106583 A1 Mar. 27, 2025

(30) Foreign Application Priority Data

Feb. 3, 2022 (EP) .................................... 22154919

(51) Int. Cl.
*H04S 7/00* (2006.01)

(52) U.S. Cl.
CPC .............. *H04S 7/304* (2013.01); *H04S 7/305* (2013.01)

(58) Field of Classification Search
CPC ...... H04S 7/304; H04S 7/305; H04S 2400/11; A63F 13/54; G06F 3/04815; H04R 2499/15

(Continued)

(56) References Cited

U.S. PATENT DOCUMENTS 10,735,885 B1 * 8/2020 Blewett .................... H04R 5/04
2012/0093320 A1 4/2012 Flaks et al.

(Continued)

FOREIGN PATENT DOCUMENTS

CN 108700942 B * 7/2021 ......... G06F 3/04815
WO 2018/002418 A1 1/2018

OTHER PUBLICATIONS

"V-PCC Codec Description", WG 7, ISO/IEC JTC 1/SC 29/WG 7 MPEG 3D Graphics Coding, ISO/IEC JTC 1/SC 29/WG 7, N00012, Oct. 2020, 73 pages.

(Continued)

*Primary Examiner* — Sean H Nguyen

(74) *Attorney, Agent, or Firm* — Nokia Technologies Oy

(57) ABSTRACT

An apparatus, method and computer program is disclosed relating to processing of virtual content. In an example embodiment, the method may comprise providing data representing one or more acoustic properties of a virtual scene, the virtual scene being for output to a user device associated with a user and comprising one or more audio sources at respective locations and identifying, based on a position of the user with respect to the one or more audio sources and the one or more acoustic properties of the virtual scene, one or more audio sources not meeting a predetermined criterion. The method may also comprise providing, via a user interface associated with the user device, one or more indicators respectively corresponding to the one or more identified audio sources. Responsive to selection of one of the one or more indicators, the method may also comprise changing the user position in the virtual scene so that the user is closer to the corresponding audio source.

20 Claims, 10 Drawing Sheets

(58) Field of Classification Search
USPC .......................................................... 381/310
See application file for complete search history.

(56) References Cited

U.S. PATENT DOCUMENTS

| | | | | |
|---|---|---|---|---|
| 2018/0359591 | A1 | 12/2018 | Bygrave | |
| 2020/0218337 | A1 | 7/2020 | Leppanen et al. | |
| 2020/0326902 | A1 * | 10/2020 | Eronen | G06F 3/165 |
| 2021/0321211 | A1 * | 10/2021 | Mate | G06F 3/017 |
| 2024/0048934 | A1 * | 2/2024 | Correia | H04R 1/1041 |

OTHER PUBLICATIONS

"MPEG-I Immersive Audio Encoder Input Format", ISO/IEC JTC 1/SC 29/WG 6, MPEG Audio Coding, N0054, Apr. 2021, 36 pages.
Extended European Search Report received for corresponding European Patent Application No. 22154919.9, dated Jul. 18, 2022, 5 pages.
Niwa et al., "Music Staging AI", IEEE International Conference on Acoustics, Speech and Signal Processing (ICASSP), Mar. 5-9, 2017, pp. 6588-6589.
International Search Report and Written Opinion received for corresponding Patent Cooperation Treaty Application No. PCT/EP2023/050686, dated Mar. 16, 2023, 10 pages.
Notice of Allowance received for corresponding European Patent Application No. 22154919.9, dated Jul. 2, 2024, 8 pages.

* cited by examiner

VIRTUAL CONTENT

RELATED APPLICATIONS

This application claims priority to PCT Patent Application No. PCT/EP2023/050686, filed Jan. 13, 2023, which claims priority to European Patent Application No. 22154919.9, filed Feb. 3, 2022, the entire disclosures of each of which are hereby incorporated herein by reference in their entireties.

FIELD

Example embodiments relate to outputting virtual content, for example outputting virtual content representing a virtual scene which may comprise one or more audio sources.

BACKGROUND

The term extended reality (XR) is sometimes used to refer to a range of technologies and methods involving virtual content which may be visual and/or aural content. Common examples are virtual reality (VR), augmented reality (AR) and mixed reality (MR). VR may refer to rendering a virtual scene in terms of video and/or audio content through a user device such as a VR headset or a handheld device, wherein the virtual scene may be updated based on user movement. AR is similar, but involves output of overlaid virtual content to augment a view of a real-world space seen through a user device such as glasses, goggles or even the camera of a handheld device. Thus, a user may be able to view the real-world environment around them, augmented or supplemented with virtual content that may be provided based on their position. The virtual content may comprise multimedia content such as pictures, photographs, video, diagrams, textual information and aural content, to give some examples. MR is similar to AR, but may be considered different in that some content is inserted into the real-world space at anchor points to give the illusion that the content is part of the real environment.

In some cases, a user may explore virtual content, e.g. a virtual scene, using six-degrees-of-freedom (6DoF) in which both rotational and translational movement of the user or user device allows the user to move around, e.g. behind, virtual objects in the scene.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is described an apparatus, comprising means for: providing data representing one or more acoustic properties of a virtual scene, the virtual scene being for output to a user device associated with a user and comprising one or more audio sources at respective locations; identifying, based on a position of the user with respect to the one or more audio sources and the one or more acoustic properties of the virtual scene, one or more audio sources not meeting a predetermined criterion; providing, via a user interface associated with the user device, one or more indicators respectively corresponding to the one or more identified audio sources; and responsive to selection of one of the one or more indicators, changing the user position in the virtual scene so that the user is closer to the corresponding audio source.

The identifying means may be configured to identify an audio source of the one or more audio sources not meeting the predetermined criterion by: estimating or measuring one or more acoustic effects at the user position from sounds emitted from the audio source; and identifying one or more adverse acoustic effects that are greater than, or are above a predetermined threshold with respect to, sounds received directly at the user position from the audio source.

The one or more adverse acoustic effects may comprise one or more of reverberation, reflection, diffusion and attenuation.

The data representing the one or more acoustic properties of the virtual scene may comprise data representing one or more geometric elements in the virtual scene and, associated with the one or more geometric elements, a respective set of one or more acoustic parameters.

The one or more geometric elements may comprise one or more of: size of the virtual scene, shape of the virtual scene, boundaries of the virtual scene and objects within the virtual scene.

The set of one or more acoustic parameters may comprise one or more of: reverberation parameters, dry and wet ratio parameters and material parameters.

The apparatus may further comprise means for receiving data indicating a subset of the one or more audio sources in the virtual scene to prioritize, and wherein the identifying means is configured to identify one or more audio sources not meeting the predetermined criterion from said subset.

The apparatus may further comprise means for providing data representing one or more acoustic properties of a real-world space in which the user consumes or will consume the virtual scene, and wherein the identifying means is configured to identify the one or more audio sources not meeting the predetermined criterion based also on the one or more acoustic properties of the real-world space.

The data representing the one or more acoustic properties of the real-world space may comprise a listener space description format (LSDF) file.

The data representing the one or more acoustic properties of the virtual scene may comprise an encoder input format (EIP) file.

The user interface may comprise a graphical user interface (GUI) displaying the one or more indicators on a display screen of the user device.

The one or more indicators may comprise a graphical representation of the corresponding audio source and/or a direction of the corresponding audio source with respect to the user position.

The GUI may display a plurality of indicators on the display screen of the user device and respective directions of the corresponding audio sources with respect to the user position, wherein responsive to selection of one of the plurality of indicators, the GUI may update to display the other indicator(s) and their updated respective position(s) and/or an option to return to the previous position in the virtual scene.

The means for changing the position of the user may be configured such that the user moves to be adjacent the corresponding audio source.

The virtual scene may comprise an extended reality, XR, virtual scene comprising visual content corresponding to the audio sources.

The user device may comprise an XR headset including a display screen and a set of headphones.

According to a second aspect, there is described a method comprising: providing data representing one or more acoustic properties of a virtual scene, the virtual scene being for output to a user device associated with a user and comprising one or more audio sources at respective locations; identifying, based on a position of the user with respect to the one or more audio sources and the one or more acoustic properties of the virtual scene, one or more audio sources not meeting a predetermined criterion; providing, via a user interface associated with the user device, one or more indicators respectively corresponding to the one or more identified audio sources; and responsive to selection of one of the one or more indicators, changing the user position in the virtual scene so that the user is closer to the corresponding audio source.

Identifying an audio source of the one or more audio sources not meeting the predetermined criterion may comprise: estimating or measuring one or more acoustic effects at the user position from sounds emitted from the audio source; and identifying one or more adverse acoustic effects that are greater than, or are above a predetermined threshold with respect to, sounds received directly at the user position from the audio source.

The one or more adverse acoustic effects may comprise one or more of reverberation, reflection, diffusion and attenuation.

The data representing the one or more acoustic properties of the virtual scene may comprise data representing one or more geometric elements in the virtual scene and, associated with the one or more geometric elements, a respective set of one or more acoustic parameters.

The one or more geometric elements may comprise one or more of: size of the virtual scene, shape of the virtual scene, boundaries of the virtual scene and objects within the virtual scene.

The set of one or more acoustic parameters may comprise one or more of: reverberation parameters, dry and wet ratio parameters and material parameters.

The method may further comprise receiving data indicating a subset of the one or more audio sources in the virtual scene to prioritize, and wherein the identifying means is configured to identify one or more audio sources not meeting the predetermined criterion from said subset.

The method may further comprise providing data representing one or more acoustic properties of a real-world space in which the user consumes or will consume the virtual scene, and wherein identifying the one or more audio sources not meeting the predetermined criterion may be based also on the one or more acoustic properties of the real-world space.

The data representing the one or more acoustic properties of the real-world space may comprise a listener space description format (LSDF) file.

The data representing the one or more acoustic properties of the virtual scene may comprise an encoder input format (EIP) file.

The user interface may comprise a graphical user interface (GUI) displaying the one or more indicators on a display screen of the user device.

The one or more indicators may comprise a graphical representation of the corresponding audio source and/or a direction of the corresponding audio source with respect to the user position.

The GUI may display a plurality of indicators on the display screen of the user device and respective directions of the corresponding audio sources with respect to the user position, wherein responsive to selection of one of the plurality of indicators, the GUI may update to display the other indicator(s) and their updated respective position(s) and/or an option to return to the previous position in the virtual scene.

Changing the position of the user may comprise moving the user to be adjacent the corresponding audio source.

The virtual scene may comprise an extended reality, XR, virtual scene comprising visual content corresponding to the audio sources.

The user device may comprise an XR headset including a display screen and a set of headphones.

According to a third aspect, there is provided a computer program product comprising a set of instructions which, when executed on an apparatus, is configured to cause the apparatus to carry out the method of any preceding method definition.

According to a fourth aspect, there is provided a non-transitory computer readable medium comprising program instructions stored thereon for performing a method, comprising: providing data representing one or more acoustic properties of a virtual scene, the virtual scene being for output to a user device associated with a user and comprising one or more audio sources at respective locations; identifying, based on a position of the user with respect to the one or more audio sources and the one or more acoustic properties of the virtual scene, one or more audio sources not meeting a predetermined criterion; providing, via a user interface associated with the user device, one or more indicators respectively corresponding to the one or more identified audio sources; and responsive to selection of one of the one or more indicators, changing the user position in the virtual scene so that the user is closer to the corresponding audio source.

The program instructions of the fourth aspect may also perform operations according to any preceding method definition of the second aspect.

According to a fifth aspect, there is provided an apparatus comprising: at least one processor; and at least one memory including computer program code which, when executed by the at least one processor, causes the apparatus to: provide data representing one or more acoustic properties of a virtual scene, the virtual scene being for output to a user device associated with a user and comprising one or more audio sources at respective locations; identify, based on a position of the user with respect to the one or more audio sources and the one or more acoustic properties of the virtual scene, one or more audio sources not meeting a predetermined criterion; provide, via a user interface associated with the user device, one or more indicators respectively corresponding to the one or more identified audio sources; and responsive to selection of one of the one or more indicators, change the user position in the virtual scene so that the user is closer to the corresponding audio source.

The computer program code of the fifth aspect may also perform operations according to any preceding method definition of the second aspect.

BRIEF DESCRIPTION OF THE FIGURES

Example embodiments will now be described, by way of example only, with reference to the accompanying drawings.

DETAILED DESCRIPTION

Figure 1:
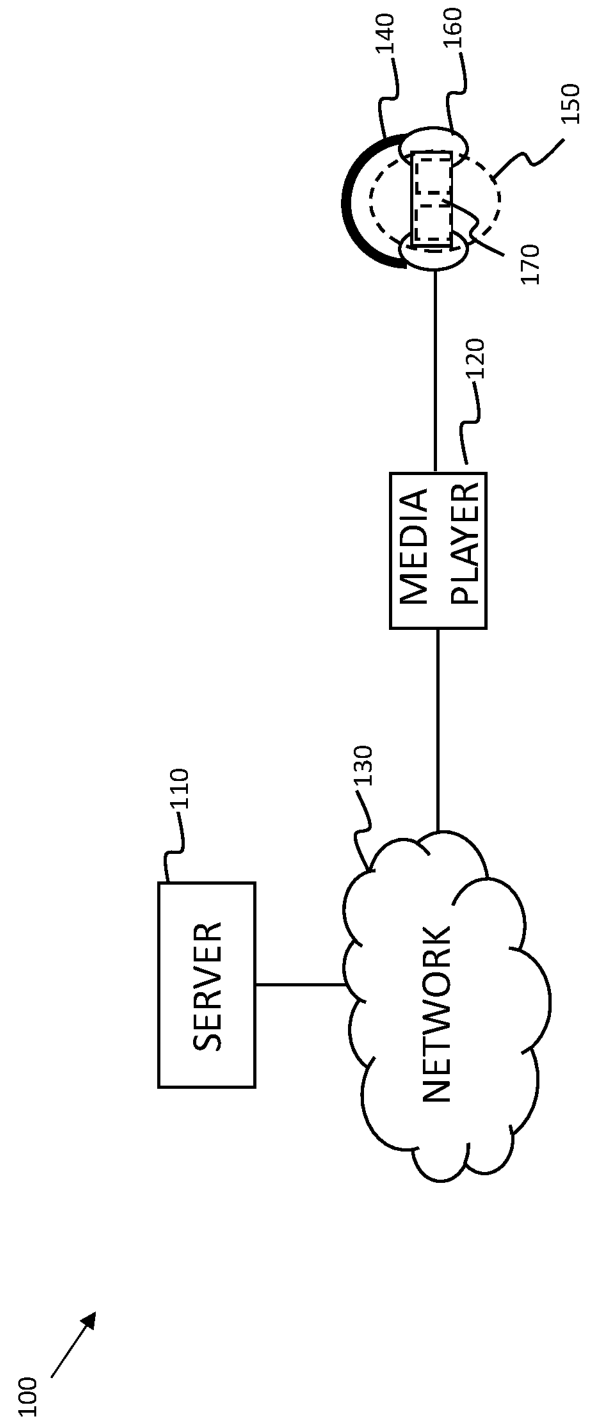
FIG. 1 is a block diagram of a system, which may be useful for understanding example embodiments.

In the description and drawings, like reference numerals refer to like elements throughout.

Example embodiments relate to an apparatus, method and computer program for outputting (alternatively "rendering") virtual content. Virtual content may represent a virtual scene which may comprise one or more audio sources as well as, optionally, one or more video objects which correspond to the one or more audio sources. For example, a virtual scene may comprise a group of musicians wherein each musician may be represented by respective video content and audio content corresponding to sounds emitted by a particular musician or musicians at a given time.

Example embodiments are therefore related to the field of extended reality (XR) and example embodiments focus on, but are not limited to, virtual reality (VR) and augmented reality (AR) applications. AR applications may also cover mixed reality (MR) applications although the former term will be used herein.

Users may consume virtual content by means of a user device. For VR, the user device may comprise a VR headset which may usually comprise a set of headphones, or equivalents such as earphones, earbuds or other forms of audio output transducers, and a set of video screens for output of the audio and video content respectively.

For AR, the user device may comprise a set of glasses, goggles or even use a camera of a handheld device to enable overlay of virtual content onto a real-world space that the user perceives at a given time. Other forms of user device may be used. In use, a user of the user device may explore the virtual scene represented by the virtual content by various means, including by changing position in the real-world space, which may also be referred to as a consumption space. The position of the user, which may include the orientation and/or spatial position of the user, may be used by a rendering engine of an XR system to output a particular portion of the virtual scene in terms of audio and/or video, which will change as the user changes position. As such, the user can choose which parts of the virtual scene they wish to hear and/or see by physical movement.

In some cases, a user may explore a virtual scene using six-degrees-of-freedom (6DoF) in which both rotational and translational movement of the user or user device allows the user to move around, e.g. behind, virtual objects in the scene. In terms of audio content, it will be appreciated that what the user hears will likely change as the user moves within the virtual content, e.g. due to some audio sources getting closer and other audio sources getting further away.

An audio source as described herein may be considered any virtualised entity, e.g. a virtual object, which emits sound perceivable by a user.

Audio sources within a virtual scene may not be localizable, or even discoverable, due to acoustic effects within the virtual scene and possibly also due to acoustic effects within the real-word space, i.e. the consumption space. By "localizable" it is meant that the user can perceive where in the virtual scene a particular audio source is, e.g. based on where the audio source's emitted sounds come from and possibly the volume. By "discoverable" it is meant that the user can be aware of that the sound source exists.

Example acoustic effects include, but are not limited to, those of reverberation, early and late reflection, diffraction and occlusion. These acoustic effects may not affect video content but, where there is a sound emitted from an audio source that, for example, cannot be seen, but which the user may nevertheless like to locate in the virtual scene, some acoustic effects may prevent or hinder the user's ability to properly know that the audio source exists and/or where it is coming from. These may be termed adverse acoustic effects which detract from the immersive user experience and may require the user to laboriously explore the virtual scene in order to find particular audio sources. The issue can be particularly problematic in complex virtual scenes, e.g. involving many audio sources and/or complex scenery.

Example embodiments may avoid or alleviate such issues by changing the user's position with respect to the virtual scene so that the user is moved closer to an audio source identified as being hard to localize or discover. In this way, the user may find the audio source quicker and more efficiently because the user is moved closer to it, which may mean the user is moved adjacent to it with no other audio source(s) in-between. This may be referred to as "teleporting." Where there is video content corresponding to the audio source, the change in user position may be reflected in the video content, i.e. so that the user also sees a visual representation of the audio source at a closer distance.

As described herein, audio sources within a virtual scene may be encoded in any suitable format, e.g. stereoscopic or spatial, with example formats for the latter including multichannel mixes such as 5.1 or 7.1+4, Ambisonics, parametric spatial audio (e.g. metadata-assisted spatial audio (MASA)), object-based audio or any combination thereof.

Determining a user's position when exploring a virtual space in 6DoF can be performed in real-time or near real-time using one or more known methods.

For example, at least part of a user's position may correspond to the position of the user's head. In this sense, the term "position" may refer to orientation, i.e. a first orientation of the user's head is a first position and a second, different orientation of the user's head is a second position. The term may also refer to spatial position within a real-world space to account for translational movements of the user. The position of the user may be determined using one or more known tracking methods, such as by use of one or more cameras which identify facial features in real-time, or by use of inertial sensors (gyroscopes/accelerometers) within a user device, satellite positioning systems such as by use of a Global Navigation Satellite System (GNSS) receiver, positioning receivers based on signals from WiFi access points and/or other methods of position determination.

FIG. 1 is a block diagram of a system 100 which may be useful for understanding example embodiments.

The system 100 may comprise a server 110, a media player 120, a network 130 and a user device 140 associated with a user 150.

The server 110 may be connected to the media player 120 by means of the network 130 for sending data, e.g., a bitstream of data representing a virtual scene comprising audio data and video data, to the media player 120. As will be explained below, other data such as metadata associated with the audio data may also be provided. The metadata may, for example, represent one or more acoustic properties of the virtual scene at a given time or over a period of time. The server 110 may send audio data, video data and possibly the other data to the media player 120 responsive to one or more data requests sent by the media player 120. For example, the media player 120 may transmit to the server 110 an indication of a position associated with a user of the media player 120, and the server may process and transmit back to the media player audio data and video data responsive to the received position, which may be performed in real-time or near real-time. This may be by means of any suitable streaming data protocol. Alternatively, or additionally, the server 110 may provide one or more files representing audio data, video data and the other data to the media player 120 for storage and processing thereat. At the media player 120, the audio data and video data may be processed, rendered and output to the user device 140 associated with the user 150.

The user device 140 may comprise any suitable device and, in this example, comprises a head-worn VR device which includes a set of headphones 160 and a display system 170 comprised of first and second display screens. In example embodiments, the user device 140 may comprise head tracking sensors for indicating to the media player 120, using any suitable method, a current position of the user 150, e.g., one or both of the orientation and spatial position of the user, in order to determine how the virtual scene represented by the audio and video data is to be rendered to the set of headphones 160 and the display system 170.

In some embodiments, the media player 120 may comprise part of the set of user device 140. In other embodiments, the media player 120 may comprise a physically separate system such as a personal computer (PC), a laptop, a games console or a wearable computing device.

The network 130 may be any suitable data communications network including, for example, one or more of a radio access network (RAN) whereby communication is via one or more base stations, a WiFi network whereby communications is via one or more access points, or a short-range network such as one using the Bluetooth® or Zigbee protocol.

As mentioned above, the server 110 may transmit other data, e.g. metadata, which may represent one or more acoustic properties of the virtual scene. This other data may be considered an audio scene description which gives a content creator freedom in terms of how the audio content will be rendered at a rendering engine, such as at the media player 120 shown in FIG. 1. As an example, a proposed form of audio scene description is the Encoder Input Format (EIF) which forms a proposal for the MPEG audio encoding working group. Example embodiments are not limited to use of EIF.

Figure 2:
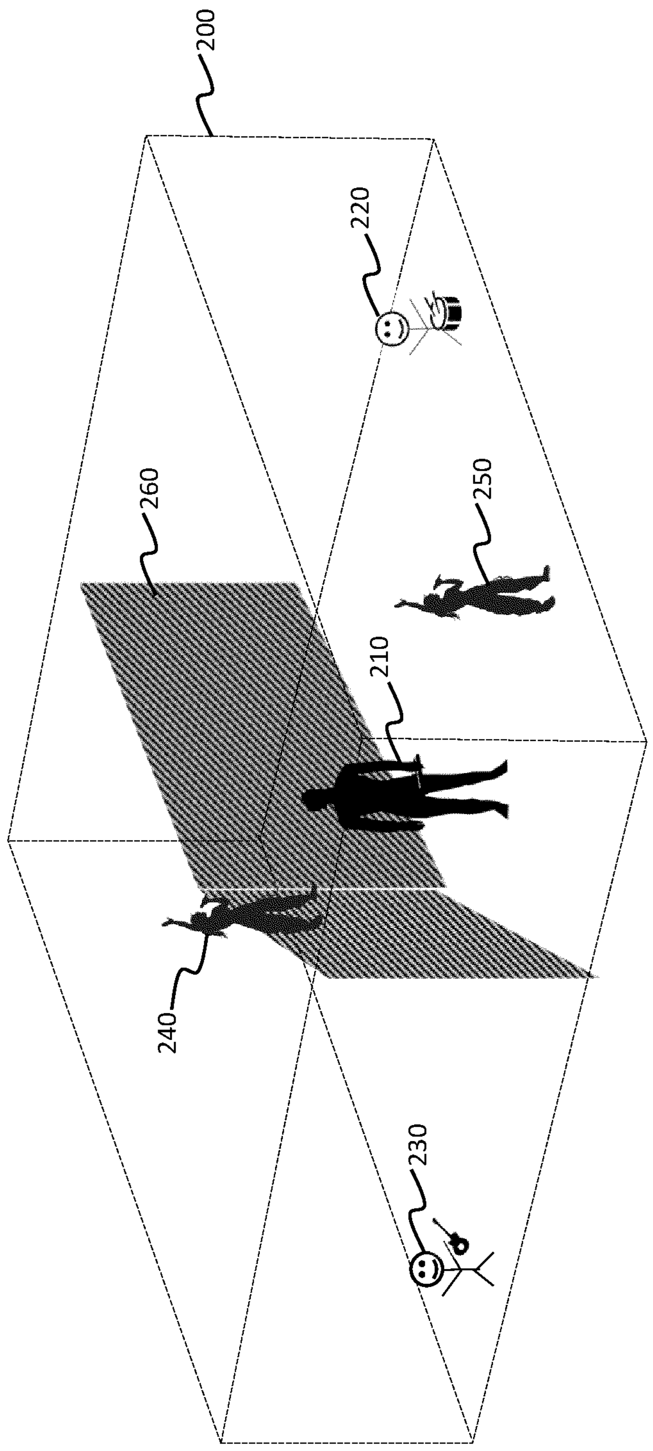
FIG. 2 is a representational view of a virtual scene, which may be useful for understanding example embodiments.

FIG. 2 is a schematic view of a virtual scene 200 that may be represented in data transmitted by the server 110 to the media player 120 shown in FIG. 1.

A position of a user 210 is indicated in relation to first to fourth audio sources 220, 230, 240, 250 within the virtual scene 200 to indicate respective perceived directions of said audio sources with respect to the user at a given time. A first audio source 220 may comprise a first instrumentalist, a second audio source 230 may comprise a second instrumentalist, a third audio source 240 may comprise a first singer and a fourth audio source 250 may comprise a second singer. A virtual partition 260 may also be in the virtual scene 200.

EIF data or similar may accompany the audio and video data representing the virtual scene 200. The EIF data may be processed by a rendering engine, such as the media player 120, to determine how the audio data of the virtual content is or will be rendered. The EIF data may define, for example, one or more geometric elements in the virtual scene and, associated with the one or more geometric elements, a respective set of one or more acoustic parameters. The geometric elements may comprise one or more of the size of the virtual scene, the shape of the virtual scene, one or more boundaries of the virtual scene and one or more objects within the virtual scene, including the first to fourth audio sources 220, 230, 240, 250. The list is non-exhaustive. The set of one or more acoustic parameters may comprise one or more of reverberation parameters (e.g. RT60 parameters), dry and wet ratio parameters and material parameters. This list is non-exhaustive.

Excerpts of example EIF data including geometric and acoustic parameters are given in Appendices A and B. Appendix A is an excerpt that indicates that the virtual scene is cube-shaped with certain dimensions and also reverberation parameters for different frequencies at two positions. Appendix B is an excerpt that indicates that the virtual scene comprises both a frequency independent material, e.g. marble, and a frequency-dependent material, e.g. upholstery, with frequency dependent characteristics thereof. Other geometric and acoustic parameters may also be defined.

Note that, other than audible volume, content creators have little or no barriers in terms of how the audio content can be defined and it may be that the virtual scene, when rendered based on the EIF data, is an exaggerated, amplified or even attenuated version of original audio content prior to encoding at the server 110.

Returning to FIG. 2, it is possible that one or more of the first to fourth audio sources 220, 230, 240, 250, when rendered by the media player 120, may not be localized or discoverable by the user 210 at the shown position. According to example embodiments, which of the first to fourth audio sources 220, 230, 240, 250 cannot be localized or discovered may be estimated, e.g. by the media player 120, based on the user position and the one or more acoustic properties of the virtual scene, e.g. as represented in the EIF data. This may, for example, be at least partially due to the presence of the virtual partition 260.

Figures 3A, 3B, 3C:
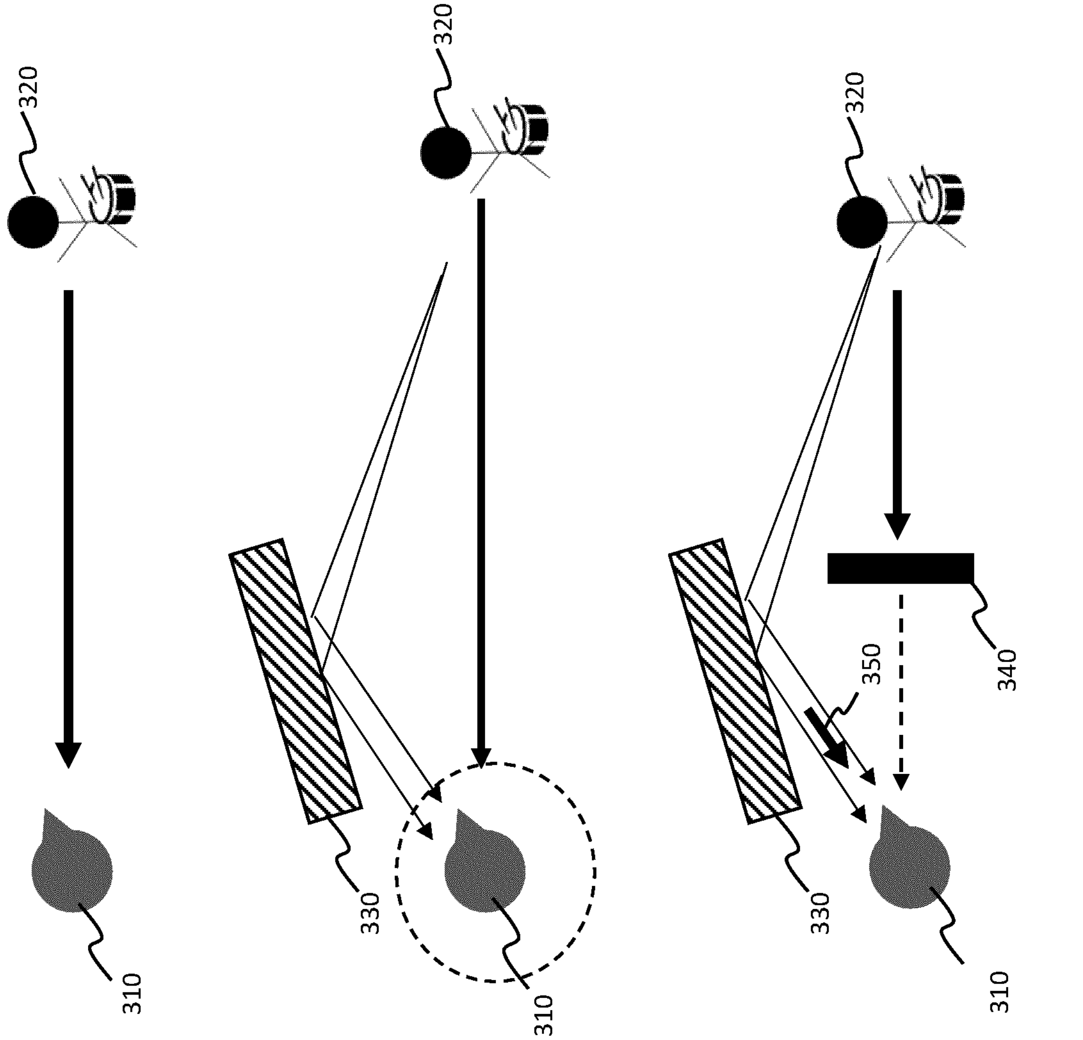
FIGS. 3A-3C are plan views of a user in relation to an audio source in respective scenarios, which may be useful for understanding example embodiments.

To illustrate generally, FIGS. 3A-3C are schematic views of a user 310 in relation to an audio source 320.

In FIG. 3A, sounds emitted by the audio source 320 are received directly by the user 310 without significant reverberation or other acoustic effects. The user 310 is able to correctly localize the audio source 320, as can be estimated by analysis of the EIF data which may accompany this virtual scene, or a rendered version thereof produced by a rendering engine.

In FIG. 3B, sounds emitted by the audio source 320 are again received directly by the user 310 but with some attenuation due to greater distance. Due also to the presence of a reflecting structural object 330, made with reflective material, the geometry and acoustic parameters of which can be provided in accompanying EIF data, there are reverberation effects. This may make it challenging for the user 310 to localize the audio source 320, as can be estimated based on knowledge of the user position and analysis of the EIF data which may accompany this virtual scene, or a rendered version thereof produced by a rendering engine.

In FIG. 3C, which is similar to FIG. 3B with the addition of an occluding structural object 340, the geometry and acoustic parameters of which can be provided also in EIF data, direct sounds emitted by the audio source 320 are significantly attenuated and there is a moderate amount of reverberation and strong reflections from the reflecting structural object 330. This may result in the user 310 incorrectly localizing the audio source 320 as coming from a different direction, indicated by arrow 350. This can also be estimated based on knowledge of the user position and analysis of the EIF data which may accompany this virtual scene, or a rendered version thereof produced by a rendering engine.

Figure 4:
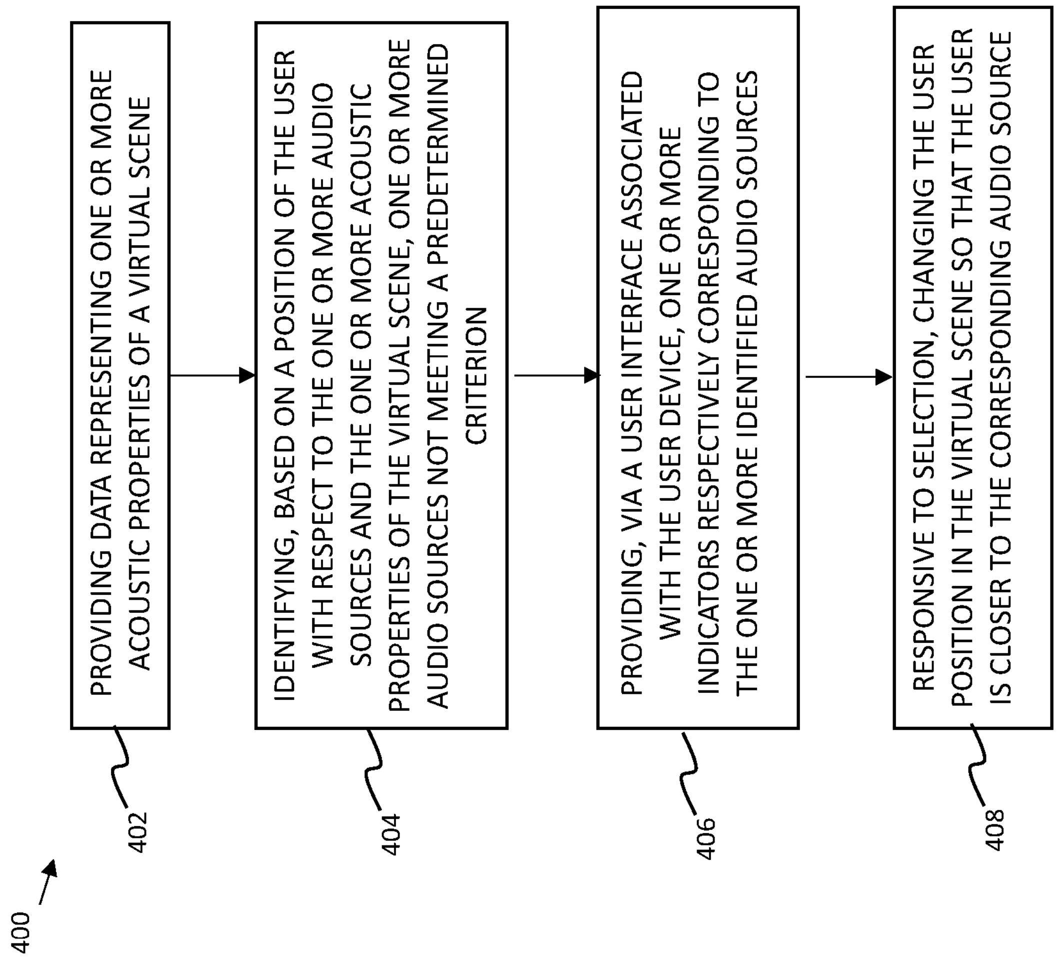
FIG. 4 is a flow diagram showing processing operations according to one or more example embodiments.

FIG. 4 is a flow diagram showing processing operations, indicated generally by reference numeral 400, according to example embodiments. The processing operations 400 may be performed in hardware, software, firmware, or a combination thereof. For example, the processing operations may be performed by a rendering engine such as the media player 120 shown in FIG. 1.

A first operation 402 may comprise providing data representing one or more acoustic properties of a virtual scene.

The term "providing" may mean "receiving", "generating", "rendering" or a combination thereof.

EIF data is an example of data representing one or more acoustic properties of a virtual scene. Another example, appropriate for AR applications, is mentioned below.

Additionally, or alternatively to the providing of EIF data (or similar), data representing one or more acoustic properties of the virtual scene may comprise a rendered version of the virtual scene, which rendering may be performed at, for example, a receiving device such as the media player 120 referenced above. As such, the term "providing" may in this context mean "rendering."

A second operation 404 may comprise identifying, based on a position of the user with respect to the one or more audio sources and the one or more acoustic properties of the virtual scene, one or more audio sources not meeting a predetermined criterion, e.g. a localization or discoverability criterion. In some embodiments, there may be more than one criterion, i.e. a set of criteria, although the former term will be used herein.

In embodiments where a rendered version of the virtual scene is provided as part of the first operation 402, one or more measurement operations may be performed using the rendered version of the virtual scene. That is, acoustic measurements may be performed or estimated at the user position in relation to the rendered version of the virtual scene, effectively to understand what the user will or is hearing at a given time and whether or not this meets the predetermined criterion. This may be performed by placement of one or more virtual microphones corresponding to the position of the user.

A third operation 406 may comprise providing, via a user interface associated with the user device, one or more indicators respectively corresponding to the one or more identified audio sources.

A fourth operation 408 may comprise, responsive to selection of one of the one or more indicators, changing the user position in the virtual scene so that the user is closer to the corresponding audio source.

In some example embodiments, in respect of the fourth operation 408, the user position may be changed such that, as well as being closer to the corresponding audio source, there are no virtual objects, e.g. occluding objects, between the user position and the corresponding audio source.

In some example embodiments, for example where one or more of the audio sources are dynamic, i.e. moving, the second operation 404 may further take into account the position of the dynamic object at the current time.

Example embodiments therefore enable a user effectively to be teleported closer to an audio source of interest, which audio source has been flagged to them because it is difficult to localize or discover from the user's current position.

In some example embodiments, identifying an audio source not meeting the predetermined criterion may comprise, for each audio source: estimating one or more acoustic effects that will be experienced at the user position from sounds emitted from the audio source and then identifying one or more adverse acoustic effects greater than, or are above a predetermined threshold with respect to, sounds received directly from that audio source.

Adverse acoustic effects may be any acoustic effect, such as one or more of reverberation, reflection, diffusion and attenuation, which individually or collectively reduce the user's ability to perceive the direction from a where a sound originates or the existence of the audio source.

With reference again to FIG. 3C, based on the user position and acoustic parameters (e.g. EIF data or that measured in a rendered version) of the shown virtual scene, it can be estimated that direct sounds from the audio source 320 will be, or are being, significantly attenuated by the occluding structural object 340. It can also be estimated that there will be, or are, moderate reverberations and strong reflections due to the reflecting structural object 330. These are adverse acoustic effects. If the estimated levels of these adverse acoustic effects dominate over the estimated level of the attenuated, directly-received sounds from the audio source 320, then the audio source does not meet the predetermined criterion.

In some embodiments, it may be that the predetermined criterion is not met even if one or more adverse acoustic effects do not dominate over directly-received sounds. For example, if one or more adverse acoustic effects are greater a predetermined threshold, e.g. if levels of reflected sounds are above 75% of the level of directly-received sounds, then the audio source may not meet the predetermined criterion. In such cases, the reflected sounds may still reduce the user's ability to localize the relevant audio source. Different respective predetermined threshold may be used for different adverse acoustic effects.

Acoustic properties of the virtual scene may comprise one or more geometric elements in the virtual scene and, associated with the one or more geometric elements, a respective set of one or more acoustic parameters. Geometric elements may comprise one or more of: size of the virtual scene, shape of the virtual scene, boundaries of the virtual scene and objects within the virtual scene. The set of one or more acoustic parameters may comprise one or more of: reverberation parameters, dry and wet ratio parameters and material parameters.

In some example embodiments, data may be received by the identifying means indicating a subset of audio sources in the virtual scene which are to be prioritized. These may be audio sources of particular interest to the user or ones which may be considered important by the content creator. In the latter, the one or more prioritized audio sources may be signalled in the transmitted bitstream. What is a prioritized audio source may also be determined dynamically at the rendering engine based on prior interactions of the user in the virtual scene or even other virtual scenes, for example what audio sources or types of audio sources the user has moved close to and/or looked-at for longer than a predetermined period. It may be that the second operation 404 is performed only in relation to such prioritized audio sources and not others.

In relation to AR applications, another operation may comprise providing data representing one or more acoustic properties of the real-world space in which the user consumes the virtual scene. This may comprise part of the first operation 402, be performed in parallel to the first operation or may be performed prior or subsequent to the first operation.

In this case, the second operation 404 may involve identifying the one or more audio sources based also on the one or more acoustic properties of the real-world space. This form of "other data" or metadata may be referred to as real-world description data and a proposed form is known as the Listener Space Description Format (LSDF) which also forms a proposal for the MPEG audio encoding working group. Similar to EIF data, LSDF data may define one or more geometric elements in the real-world space and, associated with the one or more geometric elements, a respective set of one or more acoustic parameters. Geometric elements may comprise one or more of: size of the real-world space, shape of the real-world space, boundaries of the real-world space and objects within the real-world space. The set of one or more acoustic parameters may comprise one or more of: reverberation parameters, dry and wet ratio parameters and material parameters. LSDF data, or similar, is usually not known to the content creator and hence may be provided to the rendering engine based on where the user intends or is currently using their user device, e.g. in a particular room for which LSDF data has been generated based on observations and/or measurements. For example, the user device or rendering engine associated with the user device may comprise one or more sensors, e.g. cameras, for measuring or estimating the one or more geometric elements and acoustic parameters.

Figure 5:
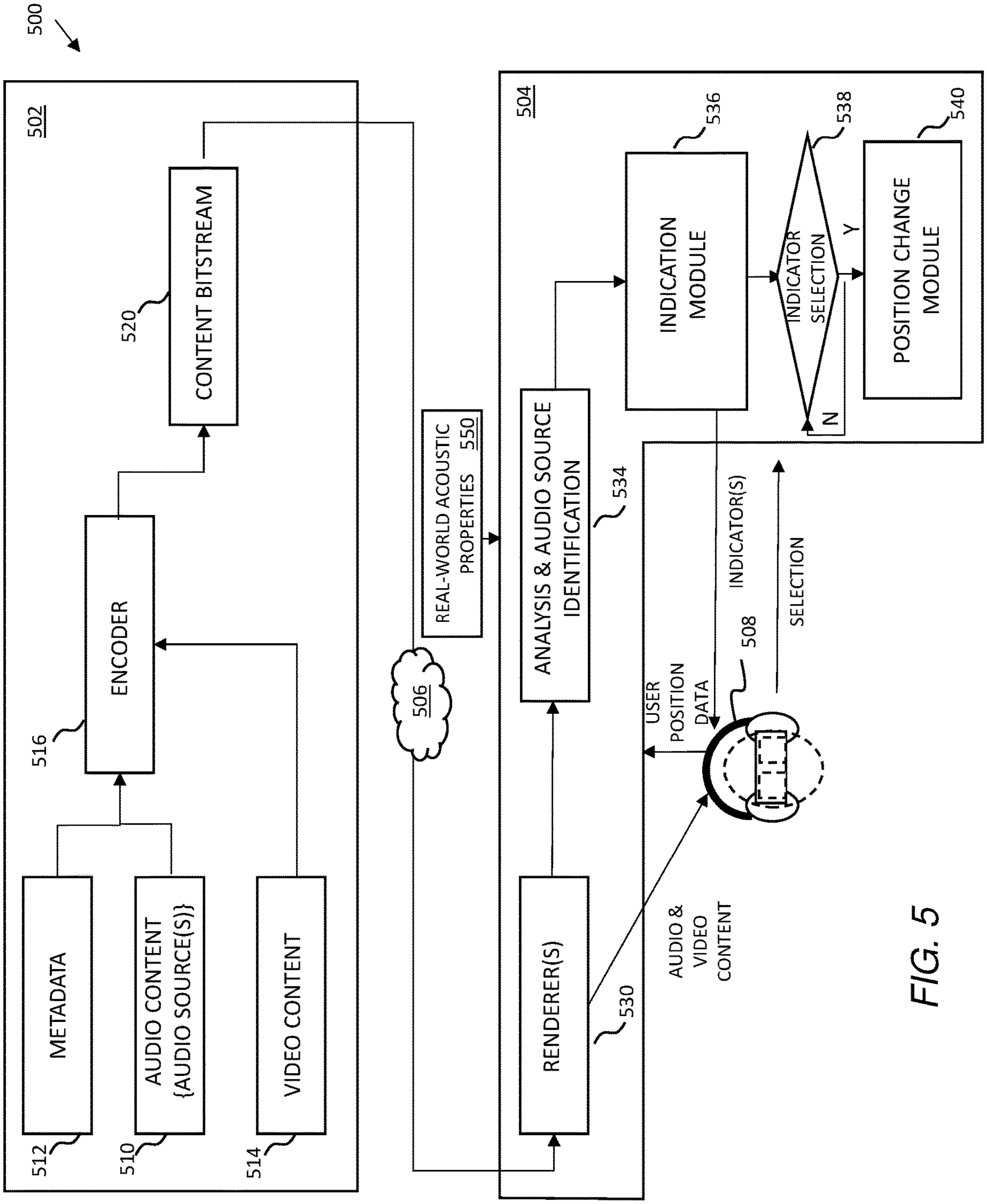
FIG. 5 is a block diagram of an extended reality (XR) system, showing functional modules according to one or more example embodiments.

FIG. 5 is a block diagram showing functional modules of an example XR system 500. The XR system 500 may comprise a server 502 and a rendering engine 504 which may communicate with one another over a network 506. The rendering engine 504, which may be the media player 120 shown in FIG. 1, may be associated with a user device 508 which may comprise a VR or AR head-worn device having features mentioned above. The user device 508 may provide user position data to the rendering engine 504.

The server 502 may provide a set of audio content 510 representing a virtual scene comprising one or more audio sources. The server may also provide metadata 512 which may be data representing one or more acoustic properties of the virtual scene, e.g. EIF data, which may or may not be in compressed form. The server may also provide a set of video content 514 corresponding to the audio content 510. The audio content 510, the metadata 512 and the video content 514 may be encoded by an encoder 516 to produce a content bitstream 520 for sending to the rendering engine 504 over the network 506. The content bitstream 520 may be an MPEG-I 6DoF content bitstream although other protocols may be suitable.

The rendering engine 504 may comprise one or more renderers 530 which may receive the content bitstream 520 and decode it for output to the user device 508 which may be based on the user position data at a given time.

Based on the decoded metadata 512 and the user position (and possibly based also on real-world acoustic properties data 550, e.g. LSDF data, if provided for an AR application) an analysis and audio source identification module 534 may be configured to identify one or more audio sources that do not meet the predetermined criterion mentioned above.

If one or more audio sources are so identified, the ability to move or teleport the user closer to the one or more identified audio sources may be signalled to the user device 508 by an indication module 536. This signalling may first involve the indication module 536 presenting an option to the user via the user device 508 to determine if the user wishes to receive indication(s) of the identified audio sources. If so, or alternatively, the signalling may involve the indication module 536 presenting one or more indicators respectively corresponding to the one or more identified audio sources.

The one or more indicators may, for example, be presented on a graphical user interface (GUI) which displays the indicators on a display screen of the user device 508, possibly overlaying the current view of video content corresponding to the virtual scene. The indicators may be displayed close to one corner or any suitable place that does not occlude interesting or significant video content. For example, the indication module 536 may display on the GUI a graphical representation of the corresponding audio source and/or a direction of the corresponding audio source relative to the user's position, e.g. to the left, centre or right hand side of the user position. Examples will be described below.

Responsive to a selection of one of the indicators, indicated by reference numeral 538, a position change module 540 may cause a change in user position in the virtual scene so that the user is closer to the corresponding audio source, i.e. the user perceives the effect of being teleported closer to the corresponding audio source. In cases where the GUI displays a plurality of indicators and respective directions of the corresponding audio sources relative to the user position, the GUI may then update after teleporting the user to display other ones of the plurality of indicators and their updated respective position(s). Alternatively, or additionally, an option to return to the previous position may be provided. These indicators/options may be similarly selectable to cause a corresponding position change by the position change module 540.

Selection may be by any suitable method, e.g. a voice command, a gesture or a touch input.

Figure 6:
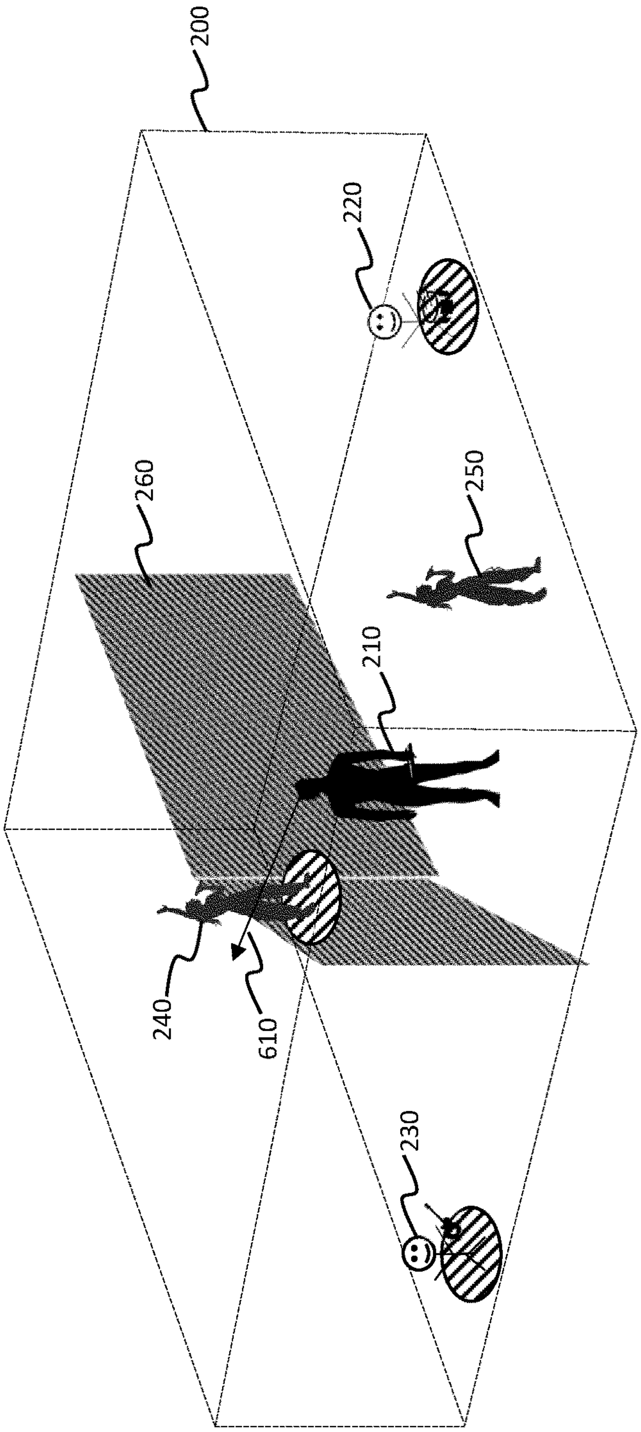
FIG. 6 is a representational view of a virtual scene, which may be useful for understanding example embodiments.

FIG. 6 is a schematic view corresponding to the FIG. 2 virtual scene 200, after processing by the analysis and audio source identification module 534. The first, second and third audio sources 220, 230, 240 have been identified as not meeting the predetermined criterion in this case, at least partially due to the presence of the virtual partition 260 and other reverberations, e.g. from boundary walls.

Figure 7A:
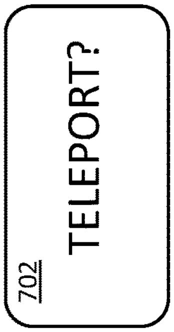
FIGS. 7A-7C show respective graphical user interface (GUI) examples that may be displayed in relation to the FIG. 6 virtual scene, according to one or more example embodiments.
Figure 7B:
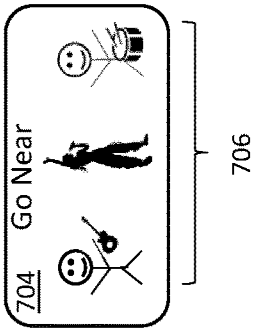

FIG. 7A shows a first GUI 702 that may be displayed on the display screen of the user device, e.g. the user device 508 shown in FIG. 5. The first GUI 702 prompts whether the user 210 wishes to receive indication(s) of the identified audio sources, e.g. by presenting a suitable option such as "teleport?" or "explore?" If selected, and with reference to FIG. 7B, another GUI 704 is displayed comprising indicators 706 corresponding to the first, second and third audio sources 220, 230, 240. Alternatively, the GUI 704 may be presented responsive to identification of the first, second and third audio sources 220, 230, 240 without the need to display the first GUI 702. The relative arrangement of the indicators 706 may be based on the current gaze direction of the user 210, indicated in FIG. 6 by arrow 610. As such, an indicator corresponding to the first audio source 220 appears to the right-hand side of the GUI 704, an indicator corresponding to the second audio source 230 appears to the left-hand side of the GUI and an indicator corresponding to the third audio source 240 appears in the centre of the GUI. The GUI 704 may enlarge or reduce in size to handle a greater or lesser number of indicators and the respective locations of identified audio sources may be indicated in various ways, e.g. using one or more of arrows, words, a grid-like arrangement of indicators, etc.

Figure 7C:
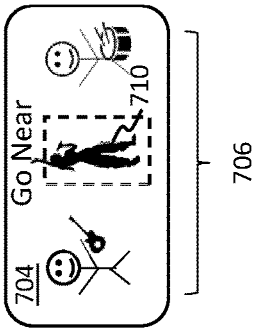
Figure 8:
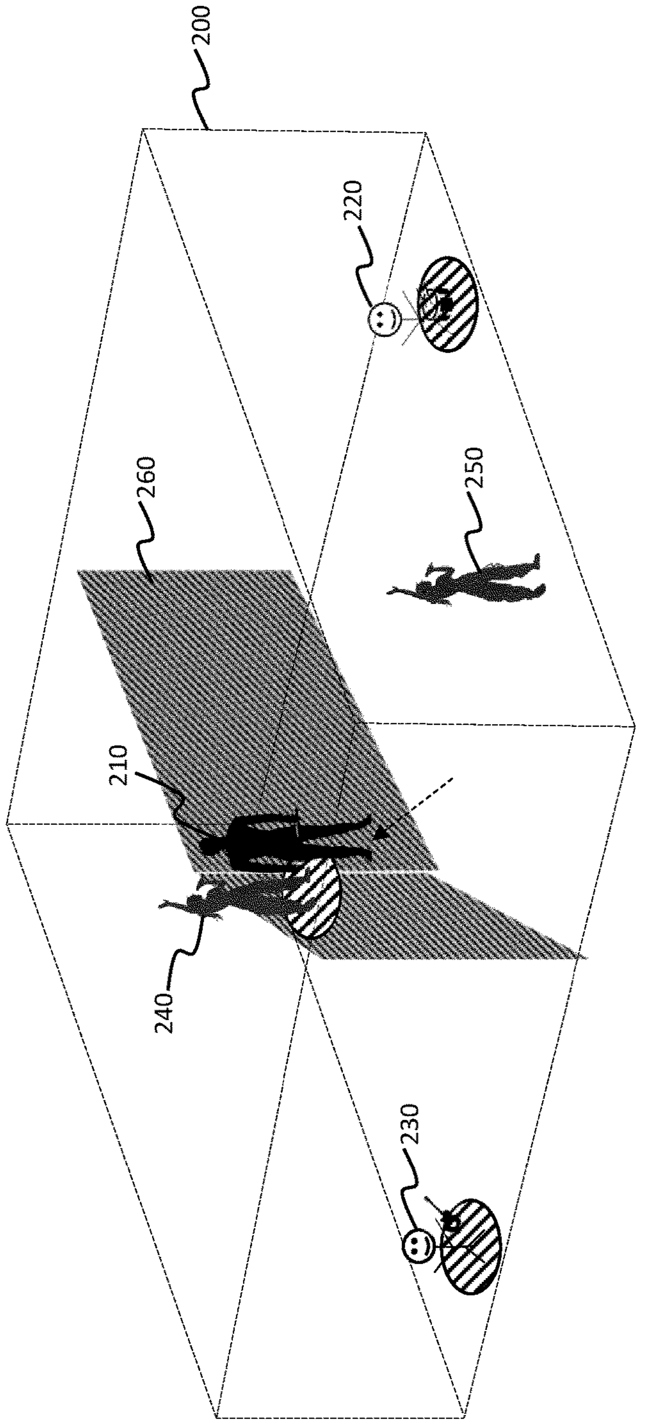
FIG. 8 is a representational view of the FIG. 6 virtual scene, subsequent to performance of a teleport operation according to one or more example embodiments.

Referring to FIG. 7C, responsive to selection of an indicator 710 on the second GUI 704 which corresponds to the third audio source 240, the user 210 may be teleported to the position shown in FIG. 8 which is closer, in this case adjacent, to the third audio source. The user 210 has discovered the presence of the third audio source 240 and can easily localize it, as well as the other identified audio sources.

Figure 9:
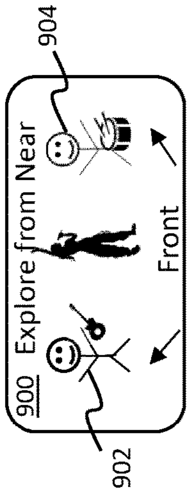
FIG. 9 shows an example GUI that may be displayed responsive to a teleport operation according to one or more example embodiments.

FIG. 9 shows a third GUI 900 which is an updated version of the second GUI 704, subsequent to teleporting. It will be seen that the third GUI 900 provides the user 210 with the option, via first and second indicators 902, 904, to teleport to the first and second audio sources 220, 230 from the new position. Arrows beneath the first and second indicators 902, 904 indicate respective directions of the first and second audio sources 220, 230 relative to the new position.

Figure 10:
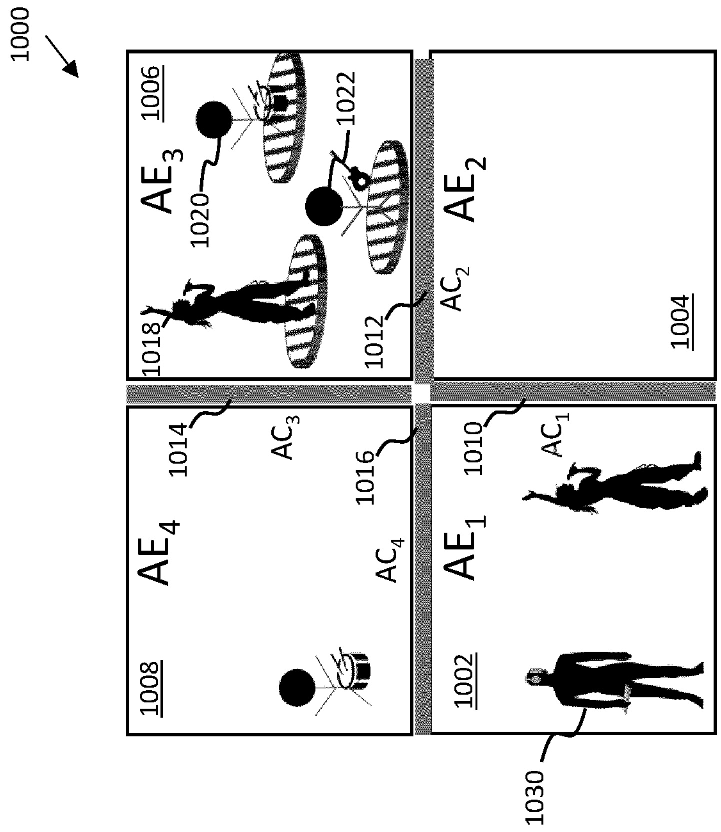
FIG. 10 is a representational view of a further virtual scene, which may be useful for understanding example embodiments.

FIG. 10 is a schematic view of another virtual scene 1000 to which example embodiments may be applied.

Figure 11:
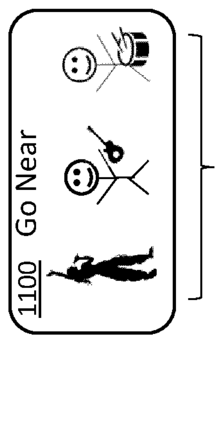
FIG. 11 shows an example GUI that may be displayed in relation to the FIG. 10 virtual scene, according to one or more example embodiments.

The virtual scene 1000 may comprise first to fourth acoustic environments (AEs) 1002, 1004, 1006, 1008 separated as shown by acoustic couplings (ACs) which may represent virtual walls that attenuate, to some extent, sounds from one AE reaching an adjacent AE. The first to fourth AEs 1002, 1004, 1006, 1008 may represent different "rooms" of the virtual scene 1000 which may, for example, reflect different types or genres of music based on the types of audio source within the different room. A user may explore in 6DoF the different rooms in the normal way, i.e. by movement, but may also wish to teleport between rooms by means of example embodiments described herein. In the shown example, a first AC 1010 separates the first and second AEs, a second AC 1012 separates the second and third AEs, a third AC 1014 separates the third and fourth AEs and a fourth AC 1016 separates the fourth and first AEs. In the shown example, the first AE 1002 comprises one audio source, the second AE 1004 comprises zero audio sources, the third AE 1006 comprises three audio sources 1018, 1020, 1022 and the fourth AE 1008 comprises one audio source. A user position 1030 is indicated within the virtual scene 1000 to indicate respective perceived directions of said audio sources with respect to the user at a given time. In accordance with example embodiments, it will be seen that the three audio sources 1018, 1020, 1022 in the third AE 1006 are identified as not meeting the predetermined criterion, e.g. because there are two ACs 1010, 1012 between the user position 1030 and said audio sources. As such, and with reference to FIG. 11, a GUI 1100 may be displayed on a user device associated with the user, the GUI displaying indicators 1102 corresponding to the three audio sources 1018, 1020, 1022. As before, the indicators 1102 are individually selectable to effect, when selected, teleporting of the user to be closer to, e.g. adjacent to, the corresponding audio source.

Figure 12:
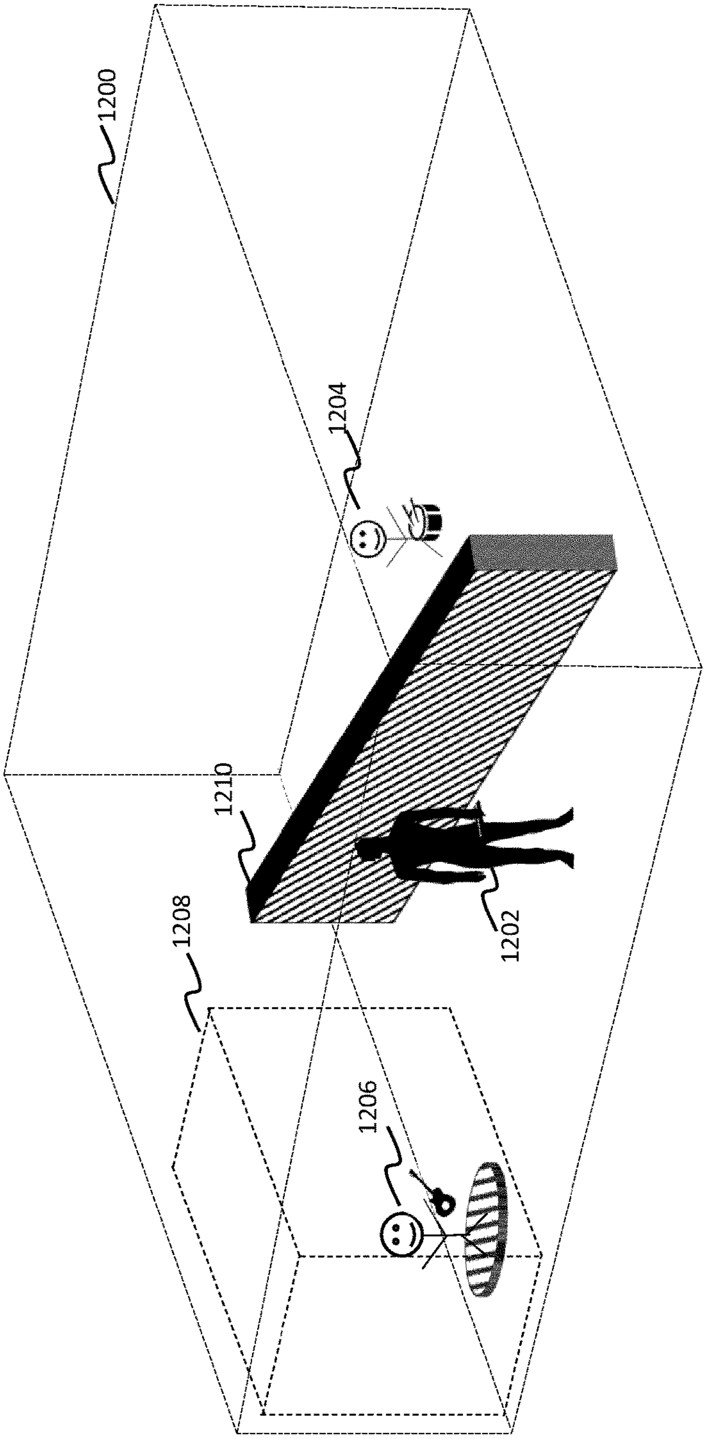
FIG. 12 is a representational view of an augmented reality (AR) scenario, which may be useful for understanding example embodiments.
Figure 13:
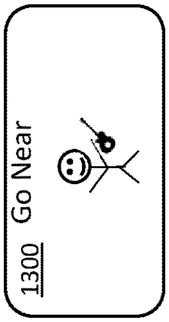
FIG. 13 shows an example GUI that may be displayed in relation to the FIG. 12 AR scenario, according to one or more example embodiments.

FIG. 12 is a schematic view of a real-world space 1200 to which example embodiments may be applied in the context of an AR application. A user position 1202 is indicated within the real-world space 1200 to indicate respective perceived directions of first and second audio sources 1204, 1206 with respect to the user at a given time. The first and second audio sources 1204, 1206 are virtual audio sources that may be overlaid onto the real-world space 1200 as the user explores what is a virtual scene projected over the real-world space. The first audio source 1204 may comprise a first instrumentalist at a first respective position and the second audio source 1206 may comprise a second instrumentalist at a second respective location within a virtual room 1208. An occluding structural object 1210, e.g. a virtual or physical wall, is positioned between the first and second audio sources 1204, 1206. In accordance with example embodiments, based on the user position 1202, the EIF data (or similar) associated with the virtual scene and the LSDF (or similar) associated with the real-world space 1200, the first audio source 1204 may be identified as not meeting the predetermined criterion. This may be because of the occluding structural object 1210 and the presence of the second audio source 1206 which is closer to, and behind, the user position 1202. As such, and with reference to FIG. 13, a GUI 1300 may be shown on a user device associated with the user, the GUI displaying an indicator 1302 corresponding to the first audio source 1204. As before, the indicator 1302 is selectable to effect, when selected, teleporting of the user to be closer to, e.g. adjacent to, the corresponding the first audio source 1204.

Example embodiments therefore enable users to quickly and efficiently know when certain audio sources cannot be localized or discovered and provides a convenient way to teleport to a position closer to a selected one of said audio sources.

Figure 14:
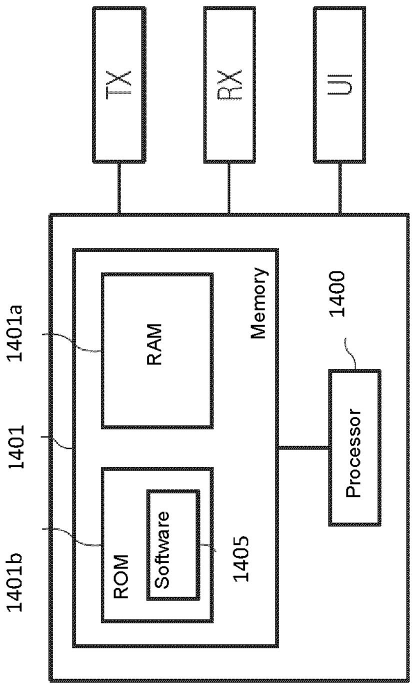
FIG. 14 shows an apparatus according to one or more example embodiments.

FIG. 14 shows an apparatus according to an embodiment, which may comprise the media player 120 as described herein. The apparatus may be configured to perform the operations described herein, for example operations described with reference to any preceding process. The apparatus comprises at least one processor 1400 and at least one memory 1401 directly or closely connected to the processor. The memory 1401 includes at least one random access memory (RAM) 1401*a* and at least one read-only memory (ROM) 1401*b*. Computer program code (software) 1405 is stored in the ROM 1401*b*. The apparatus may be connected to a transmitter (TX) and a receiver (RX). The apparatus may, optionally, be connected with a user interface (UI) for instructing the apparatus and/or for outputting data. The at least one processor 1400, with the at least one memory 1401 and the computer program code 1405 are arranged to cause the apparatus to at least perform at least the method according to any preceding process. The at least one processor 1400 may be in communication with the AR glasses, goggles, mobile phone or tablet computer described herein.

Figure 15:
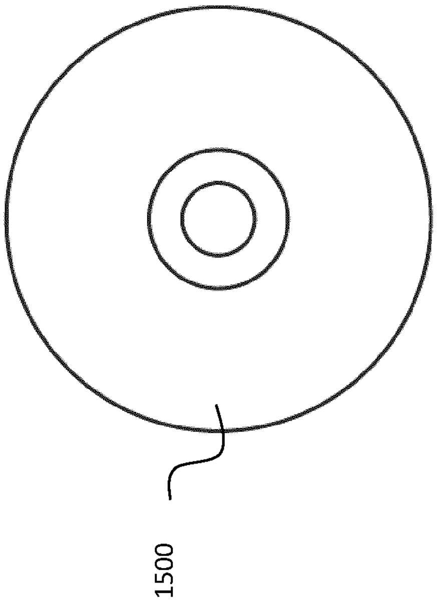
FIG. 15 shows a non-transitory medium for storing computer-readable code or instructions which, when executed by the FIG. apparatus, may perform processing operations described herein according to one or more example embodiments.

FIG. 15 shows a non-transitory medium 1500 according to some embodiments. The non-transitory medium 1500 is a computer readable storage medium. It may be e.g. a CD, a DVD, a USB stick, a blue ray disk, etc. The non-transitory medium 1500 stores computer program code, causing an apparatus to perform the method of any preceding process.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi.

A memory may be volatile or non-volatile. It may be e.g. a RAM, a SRAM, a flash memory, a FPGA block ram, a DCD, a CD, a USB stick, and a blue ray disk.

As disclosed herein, a reference to “means” may comprise at least one processor; and at least one memory including computer program code, the at least one memory and computer program code configured to, with the at least one processor, cause the performance of one or more operations of the means. A means may also comprise circuitry, hardware, software, firmware or a combination thereof.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud. Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

APPENDIX A

Example Reverberation Properties in EIF Data

```
<!-- Region where these conditions shall be simulated (optional) -->
<Box id="geo:cube1" position="1 2 -4" size="10 3.4 12" />
<AcousticEnvironment id="room1" region="geo:cube1">
  <!-- Measurements performed at position 1 -->
  <AcousticParameters position="4 2 6.5" predelay="0.075">
    <Frequency f="63.0" rt60="0.82" ddr="0.3" />
```

-continued

```
    <Frequency f="125.0" rt60="1.23" ddr="0.25" />
    <Frequency f="250.0" rt60="1.49" ddr="0.22" />
    <Frequency f="500.0" rt60="1.05" ddr="0.2" />
  </AcousticParameters>
  <!-- Measurements performed at position 2 -->
  <AcousticParameters position="-1 0.3 1.2" predelay="0.062">
    <Frequency f="500.0" rt60="0.96" ddr="0.24" />
    <Frequency f="1000.0" rt60="0.89" ddr="0.20" />
    <Frequency f="2000.0" rt60="0.82" ddr="0.14" />
  </AcousticParameters>
</AcousticEnvironment>
```

APPENDIX B

Example Material Properties in an EIF File

```
<!-- Frequency-independent material -->
<AcousticMaterial id="marble">
  <Frequency f="0.0" r="0.85" s="0.05" c="0.05" />
</AcousticMaterial>
<!-- Frequency-dependent material -->
<AcousticMaterial id="upholstery">
  <Frequency f="125.0" r="0.5" />
  <Frequency f="250.0" r="0.42" />
  <Frequency f="500.0" r="0.30" />
  <Frequency f="1000.0" r="0.21" />
  <Frequency f="2000.0" r="0.15" />
  <Frequency f="4000.0" r="0.06" />
</AcousticMaterial>
```

The invention claimed is:

1. An apparatus comprising:
at least one processor; and
at least one memory storing instructions that, when executed by the at least one processor, cause the apparatus at least to:
provide data representing one or more acoustic properties of a virtual scene, the virtual scene being for output to a user device associated with a user and comprising one or more audio sources at respective locations;
identify, based on a position of the user with respect to the one or more audio sources and the one or more acoustic properties of the virtual scene, one or more audio sources not meeting a predetermined criterion;
provide, via a user interface associated with the user device, one or more indicators respectively corresponding to the one or more identified audio sources; and
responsive to selection of one of the one or more indicators, change the user position in the virtual scene so that the user is closer to the corresponding audio source.

2. The apparatus of claim 1, wherein identifying an audio source of the one or more audio sources not meeting the predetermined criterion comprises:
estimating or measuring one or more acoustic effects at the user position from sounds emitted from the audio source; and
identifying one or more adverse acoustic effects that are greater than, or are above a predetermined threshold with respect to, sounds received directly at the user position from the audio source.

3. The apparatus of claim 2, wherein the one or more adverse acoustic effects comprise one or more of reverberation, reflection, diffusion or attenuation.

4. The apparatus of claim 1, wherein the data representing the one or more acoustic properties of the virtual scene comprises data representing one or more geometric elements in the virtual scene and, associated with the one or more geometric elements, a respective set of one or more acoustic parameters.

5. The apparatus of claim 4, wherein the one or more geometric elements comprise one or more of: size of the virtual scene, shape of the virtual scene, boundaries of the virtual scene or objects within the virtual scene.

6. The apparatus of claim 4, wherein the set of one or more acoustic parameters comprise one or more of: reverberation parameters, dry and wet ratio parameters or material parameters.

7. The apparatus of claim 1, wherein the apparatus is further caused to receive data indicating a subset of the one or more audio sources in the virtual scene to prioritize, and wherein the identifying one or more audio sources comprises identifying one or more audio sources not meeting the predetermined criterion from the subset of the one or more audio sources in the virtual scene to prioritize.

8. The apparatus of claim 1, wherein the apparatus is further caused to provide data representing one or more acoustic properties of a real-world space in which the user consumes or will consume the virtual scene, and wherein identifying one or more audio sources further comprises to identifying the one or more audio sources not meeting the predetermined criterion based also on the one or more acoustic properties of the real-world space.

9. The apparatus of claim 8, wherein the data representing the one or more acoustic properties of the real-world space comprises a listener space description format, LSDF, file.

10. The apparatus of claim 1, wherein the data representing the one or more acoustic properties of the virtual scene comprises an encoder input format, EIP, file.

11. The apparatus of claim 1, wherein the user interface comprises a graphical user interface displaying the one or more indicators on a display screen of the user device.

12. The apparatus of claim 11, wherein the one or more indicators comprise at least one of a graphical representation of the corresponding audio source or a direction of the corresponding audio source with respect to the user position.

13. The apparatus of claim 11, wherein the graphical user interface displays a plurality of indicators on the display screen of the user device and respective directions of the corresponding audio sources with respect to the user position, wherein responsive to selection of one of the plurality of indicators, the graphical user interface updates to display at least one of: other indicators and their updated respective positions or an option to return to a previous position in the virtual scene.

14. The apparatus of claim 1, wherein changing the position of the user comprises moving the user to be adjacent the corresponding audio source.

15. A method, comprising:

providing data representing one or more acoustic properties of a virtual scene, the virtual scene being for output to a user device associated with a user and comprising one or more audio sources at respective locations;

identifying, based on a position of the user with respect to the one or more audio sources and the one or more acoustic properties of the virtual scene, one or more audio sources not meeting a predetermined criterion;

providing, via a user interface associated with the user device, one or more indicators respectively corresponding to the one or more identified audio sources; and responsive to selection of one of the one or more indicators, changing the user position in the virtual scene so that the user is closer to the corresponding audio source.

16. The method of claim 15, wherein the identifying one or more audio sources further comprises identifying an audio source of the one or more audio sources not meeting the predetermined criterion by:

estimating or measuring one or more acoustic effects at the user position from sounds emitted from the audio source; and identifying one or more adverse acoustic effects that are greater than, or are above a predetermined threshold with respect to, sounds received directly at the user position from the audio source.

17. The method of claim 16, wherein the one or more adverse acoustic effects comprise one or more of reverberation, reflection, diffusion or attenuation.

18. The method of claim 15, wherein the data representing the one or more acoustic properties of the virtual scene comprises data representing one or more geometric elements in the virtual scene and, associated with the one or more geometric elements, a respective set of one or more acoustic parameters.

19. The method of claim 18, wherein the one or more geometric elements comprise one or more of: size of the virtual scene, shape of the virtual scene, boundaries of the virtual scene or objects within the virtual scene.

20. A non-transitory computer readable medium comprising program instructions stored thereon for performing at least the following:

providing data representing one or more acoustic properties of a virtual scene, the virtual scene being for output to a user device associated with a user and comprising one or more audio sources at respective locations;

identifying, based on a position of the user with respect to the one or more audio sources and the one or more acoustic properties of the virtual scene, one or more audio sources not meeting a predetermined criterion;

providing, via a user interface associated with the user device, one or more indicators respectively corresponding to the one or more identified audio sources; and responsive to selection of one of the one or more indicators, changing the user position in the virtual scene so that the user is closer to the corresponding audio source.

* * * * *